United States Patent [19]
Hoyer

[11] Patent Number: 5,882,361
[45] Date of Patent: Mar. 16, 1999

[54] METHOD FOR PRODUCING CALCIUM CHLORIDE SCALES

[75] Inventor: Friedrich Hoyer, Zürich, Switzerland

[73] Assignee: CT Umwelttechnik AG, Winterthur, Switzerland

[21] Appl. No.: 18,597

[22] Filed: Feb. 4, 1998

[30] Foreign Application Priority Data

Feb. 5, 1997 [EP] European Pat. Off. ............. 97810067

[51] Int. Cl.⁶ .................................................. C01F 5/30
[52] U.S. Cl. .............................................. 23/304; 423/497
[58] Field of Search ................... 23/304, 295 R; 423/497

[56] References Cited

U.S. PATENT DOCUMENTS

| | | | |
|---|---|---|---|
| 1,851,309 | 3/1932 | Heath | 23/304 |
| 1,869,906 | 8/1932 | Martin | 423/159 |
| 2,839,360 | 6/1958 | Gump et al. | 23/304 |
| 2,882,126 | 4/1959 | Conrad | 23/304 |
| 3,071,816 | 1/1963 | Allen et al. | 264/37.29 |

FOREIGN PATENT DOCUMENTS

| | | |
|---|---|---|
| 1.277.801 | 4/1962 | France . |
| 2.197.637 | 3/1974 | France . |
| 91/00324 | 1/1991 | WIPO ................................ 423/497 |

*Primary Examiner*—Ngoc-Yen Nguyen
*Attorney, Agent, or Firm*—Townsend and Townsend and Crew LLP

[57] ABSTRACT

In the method, calcium chloride scales (75) are produced on a cooled surface (20), namely through the application of a layer (70) consisting of an aqueous $CaCl_2$ solution (7) to the cooled surface, solidification of the layer and stripping off the solidified layer. The solution contains less than 70% $CaCl_2$ by weight, preferably less than 65% $CaCl_2$ by weight. The layer thickness is set to a maximum of about 1 mm. A relative speed between the point of application of the solution and the cooling surface is produced so that a specific production rate of at least 20 g/s m² is connected with this relative speed. The heat is carried off so rapidly through the cooling surface that the solidified layer remains largely free from calcium chloride dihydrate, $CaCl_2.2H_2O$. Dry scales thus arise.

10 Claims, 1 Drawing Sheet

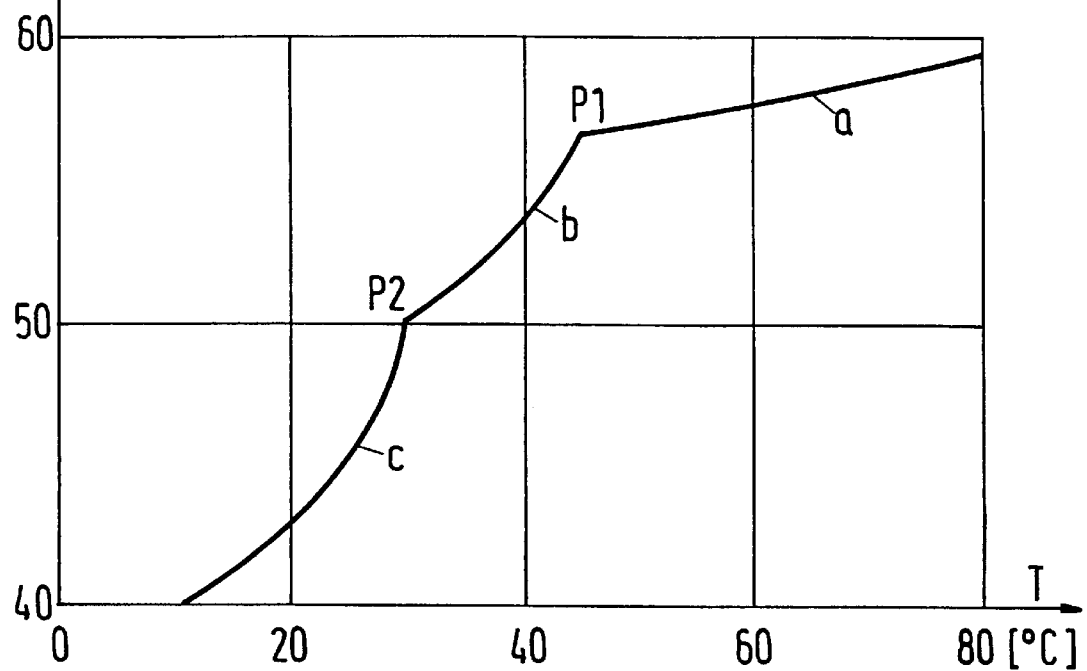
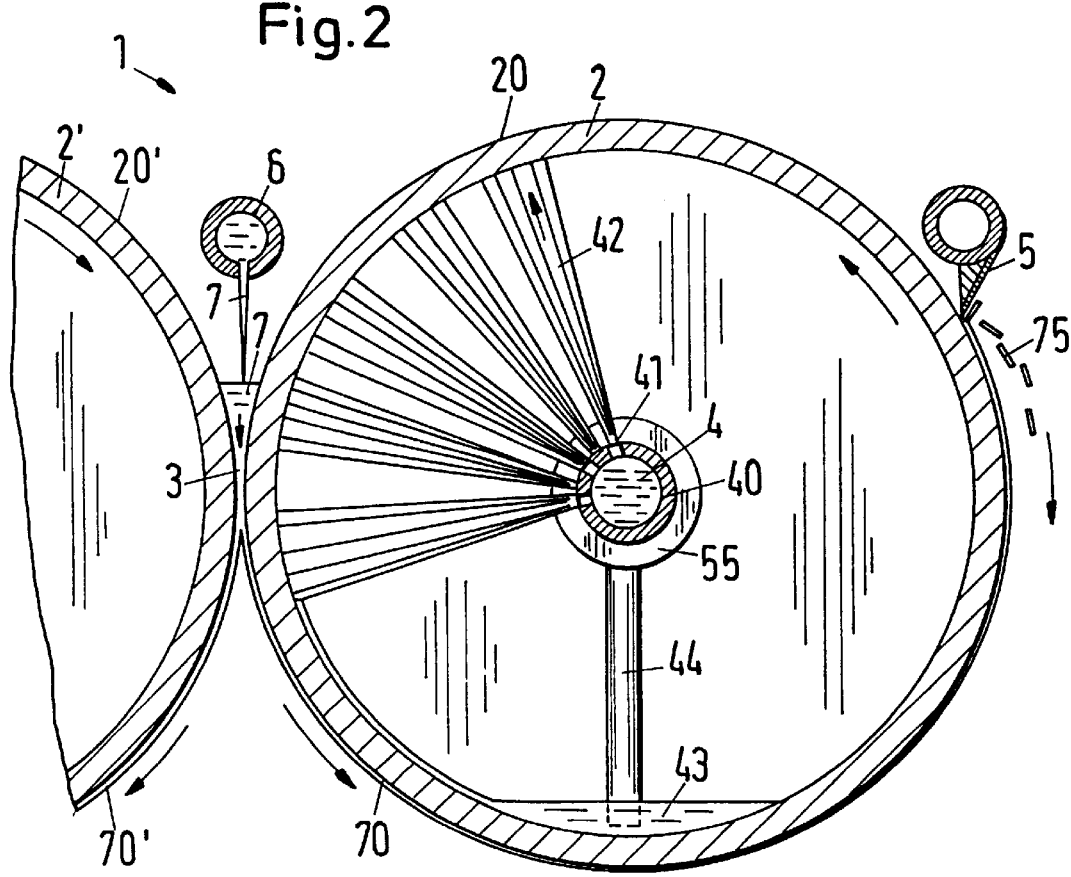

METHOD FOR PRODUCING CALCIUM CHLORIDE SCALES

BACKGROUND OF THE INVENTION

The invention relates to a method for producing calcium chloride scales. It also refers to a use of the method in the washing of exhaust gases.

The washing of exhaust gases, which are required for the incineration of rubbish, yield diverse solid substances which must be disposed of or which may in part be recycled. One of these substances is calcium chloride $CaCl_2$. The $CaCl_2$ contained in a dilute aqueous solution only becomes disposable or recyclable through concentration of the solution. The $CaCl_2$ is advantageously brought into a solid form, which is stable at environmental temperatures of 20 to 25° C. A hot $CaCl_2$ solution whose concentration amounts to 75.5% by weight solidifies on cooling to calcium chloride dihydrate $CaCl_2.2H_2O$.

It is known that, in addition to $CaCl_2.2H_2O$, crystalline calcium chloride hydrates with a greater proportion of water exist; namely $CaCl_2.4H_2O$ and $CaCl_2.6H_2O$.

It should therefore be possible to obtain a solid product of $CaCl_2.4H_2O$ or $CaCl_2.6H_2O$ respectively from a solution with 60.6% $CaCl_2$ by weight or even 50.7% by weight. For a saving in energy as well as savings in the complication and expense of the apparatus which is associated with the concentration process, it would be desirable to produce such a product with an increased proportion of water. However, as practice has shown when a water-rich solution cools down—with the use of, for example, a cooling roller—a soft product arises which does not consist completely of crystallised phases, but still contains liquid components.

SUMMARY OF THE INVENTION

The object of the invention is to provide a method by means of which a solid product can be made from an aqueous $CaCl_2$ solution, and indeed in the form of dry scales, wherein this product should have a greater proportion of water in comparison with calcium chloride dihydrate.

In the method, calcium chloride scales are produced on a cooled surface, namely through the application of a layer consisting of an aqueous $CaCl_2$ solution to the cooling surface, solidification of the layer and stripping off the solidified layer. The solution contains less than 70% by weight, and preferably less than 65% by weight $CaCl_2$. The layer thickness is set to a maximum of about 1 mm. A relative speed between the point of application of the solution and the cooling surface is produced so that a specific production rate of at least 20 g/s m² is associated with this relative speed. The heat is carried off so rapidly through the cooling surface that the solidified layer remains largely free from calcium chloride dihydrate, $CaCl_2.2H_2O$. Dry scales thus arise.

BRIEF DESCRIPTION OF THE DRAWINGS

The invention will be described in the following with reference to the drawings. Shown are:

FIG. 1 a simplified illustration of the diagram of the solubility of $CaCl_2$ in water and FIG. 2 a cross-section through an arrangement with a pair of cooling rollers by means of which dry calcium chloride scales can be produced in accordance with the invention.

DESCRIPTION OF THE PREFERRED EMBODIMENTS

The temperature is plotted on the abscissa of the diagram shown in FIG. 1, the $CaCl_2$ concentration in % by weight on the ordinate. The following pairs of values are associated with the points P1 and P2: (45.5° C.; 56.6%) and (30.0° C.; 50.2%). The curve section a specifies the solubility of $CaCl_2$ for temperatures greater than 45.5° C.: namely the $CaCl_2$ concentration as a function of the temperature when the two phases which are formed of saturated $CaCl_2$ solution and crystallised out $CaCl_2.2H_2O$ coexist. The right end of the curve section a lies outside the range considered. In the range between the points P1 and P2—curve section b—$CaCl_2.4H_2O$ is present as a precipitate. At the transition from curve section b to curve section c at P2, $CaCl_2.6H_2O$ occurs as a further precipitate.

If a $CaCl_2$ solution with a concentration of, for example, 65% and a temperature of 115° C. is cooled down, crystals of calcium chloride dihydrate form. At the same time the $CaCl_2$ concentration of the liquid phase is reduced. The concentration drops to below 60.6% without $CaCl_2.4H_2O$ already being precipitated. The formation of $CaCl_2.4H_2O$ begins at 45° C. (point P1). The proportion of water is now however too great for the remainder of the liquid phase to be completely convertible to a solid phase of $CaCl_2.4H_2O$. The formation of a solid phase of $CaCl_2.6H_2O$ beginning at point P2 also does not lead to a complete solidification of the phase mixture.

The idea of the invention proceeds from the notion that the formation of the phase is a time dependent process and that, as a result of the kinetics of the phase formation, it could be possible to prevent the formation of $CaCl_2.2H_2O$ through a very rapid cooling. Instead of $CaCl_2.2H_2O$, only $CaCl_2.4H_2O$ and possibly $CaCl_2.6H_2O$ should form.

Experiments with a simple cooling roller which was brought into contact with the free surface of a hot $CaCl_2$ solution yielded negative results. The scales produced were only partially solid and had a moist surface at one side in each case. These scales were judged to be unusable with respect to the goal aimed for.

Positive results were finally obtained with an arrangement 1 as is illustrated in FIG. 1: Dry $CaCl_2$ scales 75 are produced by means of a pair of oppositely rotating cooling rollers 2, 2' which are arranged in parallel and horizontally with the cylindrical surfaces of the rollers representing two cooling surfaces 20, 20'. A gap 3 of adjustable width remains free between the cooling rollers 2, 2'. The hot $CaCl_2$ solution 7 is applied to the cooling surfaces 20, 20' over and along the gap 3 using a distributor tube 6.

Two layers 70, 70' of $CaCl_2$ solution are applied through the gap 3 to the cooling surfaces 20, 20∝0. As a result of the removal of heat, the layers solidify. Finally, the solidified layers are in each case stripped off the roller 2 with a knife 5, with scales 75 arising. In order that the scales 75 are dry, the gap 3 must be adjusted in such a manner that the resulting thicknesses of the layers 70, 70' are not greater than about 1 mm. The speed of rotation of the rollers 2, 2' is adjusted in such a manner that the specific production rate is as high as possible (at least 20 g/s m²). During this, the heat must be carried off so rapidly through the cooling surface that the solidified layer remains largely free from calcium chloride dihydrate.

A $CaCl_2$ solution 7 is advantageously used which contains at least 61% $CaCl_2$ and which has a temperature of at least 115° C. The cooling surfaces 20, 20' must be held at a temperature less than 15° C.

The inner surface of the tubular roller 2 is sprayed with a coolant 4 having a temperature below 12° C. The same holds for the other roller 2'. The coolant 4 is supplied via a central tube 40 which is not co-moved and ejected radially in fine jets 42 by means of nozzles 41. The coolant 4 forms a sump 43, from which it is sucked up again out of the roller 2 via a riser tube 44 and an outlet point coaxial to the tube 40.

A maximum width of about 1 mm is chosen for the adjustable gap 3. The speed of rotation of the rollers 20, 20' is between 0.5 and 3 rotations per minute.

The $CaCl_2$ solution can have a concentration lower than 61%. The composition of the scales in this case comprises $CaCl_2.4H_2O$ and $CaCl_2.6H_2O$. The heat extraction must proceed in a shock-like manner.

If the method in accordance with the invention is used to produce dry calcium chloride scales when washing exhaust gases, the scales as a rule contain impurities of NaCl and $CaSO_4$. The scales produced can be packed in containers capable of being transported and stored.

The method in accordance with the invention can naturally also be performed with other apparatuses. For example, an apparatus can be used which comprises a stationary cooling surface and a movable application point for the $CaCl_2$ solution as well as a co-moved stripping, peeling off and collection device for the scales. For this, it is merely necessary to provide for a suitable relative speed between the point of application and the cooling surface as well as for the formation of a sufficiently thin layer of the applied $CaCl_2$ solution.

What is claimed is:

1. A method for producing calcium chloride scales on a cooled surface, the method comprising the steps of:

applying a layer of an aqueous $CaCl_2$ solution to a cooled surface, the solution containing less than 70% $CaCl_2$ by weight;

producing a relative motion between the location of applying the layer of the aqueous $CaCl_2$ solution and the cooled surface, and maintaining the layer of the aqueous $CaCl_2$ solution at a maximum thickness of about 1 mm;

cooling the surface to solidify the applied layer of the aqueous $CaCl_2$ solution at such a rapid rate that the solidified layer is substantially free from calcium chloride dihydrate ($CaCl_2$-$2H_2O$); and forming dry scales from the solidified layer, wherein the dry scales comprise $CaCl_2$-$4H_2O$ and optionally $CaCl_2$-$6H_2O$.

2. The method of claim 1 wherein the aqueous $CaCl_2$ solution contains less than 65% $CaCl_2$ by weight.

3. The method of claim 1 wherein the aqueous $CaCl_2$ solution contains at least 61% $CaCl_2$ by weight and has a temperature of at least 115° C., and the surface is cooled to a temperature of less than 15° C.

4. The method of claim 1 wherein the surface is formed by an outer surface of a rotating tube having an inner surface sprayed with a coolant having a temperature of below 12° C.

5. The method of claim 1 wherein the step of applying comprises applying the aqueous $CaCl_2$ solution to a pair of oppositely rotating cylindrical surfaces of parallel and horizontally disposed rollers over and along a gap disposed therebetween, the gap having an adjustable width and the rotating surfaces being cooled in the step of cooling.

6. The method of claim 5 further comprising the step of adjusting the width of the gap to a maximum size of about 1 mm.

7. The method of claim 1 wherein the aqueous $CaCl_2$ solution contains at least 61% $CaCl_2$ by weight and the step of cooling the surface occurs in a manner to form dry scales having a composition comprising $CaCl_2$-$4H_2O$ and $CaCl_2$-$6H_2O$.

8. The method of claim 1 further comprising the step of packing the dry scales in transportable and storable containers.

9. The method of claim 1 further comprising the step of obtaining the aqueous $CaCl_2$ solution by washing exhaust gas from incineration of rubbish.

10. The method of claim 9 wherein the aqueous $CaCl_2$ solution contains impurities that produce dry scales having NaCl and $CaSO_4$ impurities.

* * * * *